(12) United States Patent
Yoshida

(10) Patent No.: US 10,479,414 B2
(45) Date of Patent: Nov. 19, 2019

(54) VEHICLE FRAME BODY MANUFACTURING METHOD AND VEHICLE FRAME STRUCTURE

(71) Applicant: TOYOTA JIDOSHA KABUSHIKI KAISHA, Toyota-shi (JP)

(72) Inventor: Eiji Yoshida, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 111 days.

(21) Appl. No.: 15/653,626

(22) Filed: Jul. 19, 2017

(65) Prior Publication Data

US 2018/0057070 A1 Mar. 1, 2018

(30) Foreign Application Priority Data

Aug. 26, 2016 (JP) .................. 2016-166191

(51) Int. Cl.
| | | |
|---|---|---|
| *B62D 27/02* | (2006.01) | |
| *B21D 39/04* | (2006.01) | |
| *B62D 25/06* | (2006.01) | |
| *F16B 17/00* | (2006.01) | |
| *B62D 25/02* | (2006.01) | |
| *B62D 65/00* | (2006.01) | |
| *B62D 29/00* | (2006.01) | |

(52) U.S. Cl.
CPC .......... *B62D 27/023* (2013.01); *B21D 39/04* (2013.01); *B62D 25/02* (2013.01); *B62D 25/06* (2013.01); *B62D 65/00* (2013.01); *F16B 17/004* (2013.01); *B62D 29/008* (2013.01)

(58) Field of Classification Search
CPC .... B62D 25/06; B62D 27/023; B62D 29/008; B21D 39/04; B21D 49/00; B21D 49/005; B21C 23/00; B23P 19/04; F16B 17/004
See application file for complete search history.

(56) References Cited

U.S. PATENT DOCUMENTS

| | | | | |
|---|---|---|---|---|
| RE25,914 E | * | 11/1965 | Richter et al. ....... | B62D 33/046 280/407.1 |
| 6,322,135 B1 | * | 11/2001 | Okana .................. | B62D 25/025 296/193.05 |

(Continued)

FOREIGN PATENT DOCUMENTS

| | | |
|---|---|---|
| JP | 7-265974 A | 10/1995 |
| JP | 9-76937 A | 3/1997 |

(Continued)

*Primary Examiner* — Hilary L Gutman
(74) *Attorney, Agent, or Firm* — Oblon, McClelland, Maier & Neustadt, L.L.P.

(57) ABSTRACT

A method of manufacturing a vehicle frame body, the method includes: a placement process of placing a reinforcing member at a portion of a frame member, the portion being located in a length direction of the frame member and within the frame member, the frame member being a single member having an elongated shape and configuring a chamber structure; and, after the placement process, a bending process of bending the frame member at a placement region of the reinforcing member, causing reaction force to be generated by the reinforcing member against the frame member undergoing cross-sectional deformation, and pressure joining the reinforcing member to the frame member.

3 Claims, 8 Drawing Sheets

(56) References Cited

U.S. PATENT DOCUMENTS

| | | | |
|---|---|---|---|
| 2010/0181804 A1* | 7/2010 | Malvino | B62D 23/005 |
| | | | 296/205 |
| 2014/0234018 A1 | 8/2014 | Imamura | |
| 2015/0183470 A1 | 7/2015 | Imamura | |
| 2017/0043811 A1* | 2/2017 | Bogachuk | B62D 25/04 |

FOREIGN PATENT DOCUMENTS

| | | |
|---|---|---|
| JP | 11-255149 | 9/1999 |
| JP | 2000-117334 A | 4/2000 |
| JP | 2004-130985 | 4/2004 |
| JP | 2008-189273 A | 8/2008 |
| JP | 2013-159153 A | 8/2013 |
| JP | 2013-184492 | 9/2013 |
| JP | 2014-184950 | 10/2014 |

\* cited by examiner

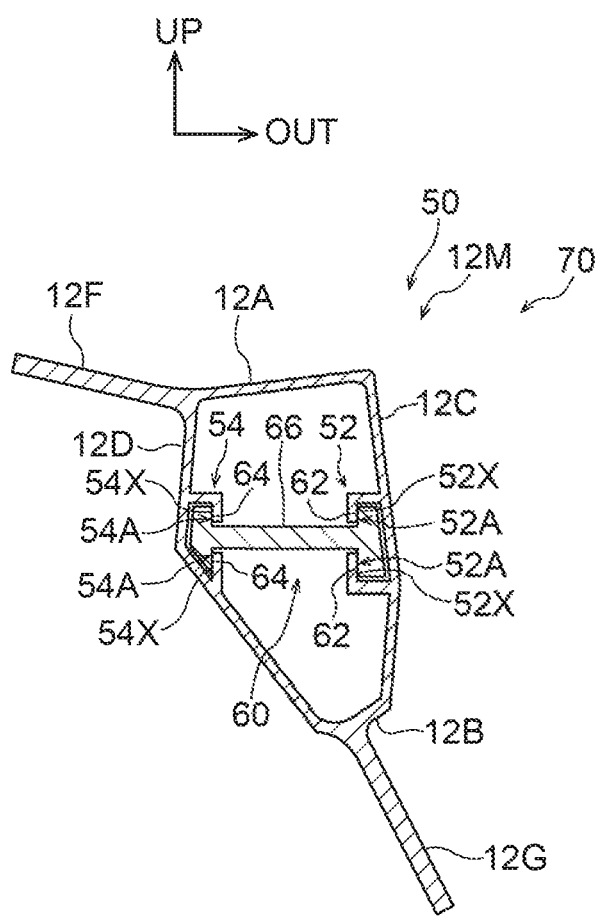

VEHICLE FRAME BODY MANUFACTURING METHOD AND VEHICLE FRAME STRUCTURE

CROSS-REFERENCE TO RELATED APPLICATION

This application claims priority under 35 USC 119 from Japanese Patent Application No. 2016-166191 filed Aug. 26, 2016, the disclosure of which is incorporated by reference herein in its entirety.

BACKGROUND

Technical Field

Preferred embodiments relate to a vehicle frame body manufacturing method and a vehicle frame structure.

Related Art

Vehicle frame members are sometimes formed by extrusion molding, as shown in, for example, Japanese Patent Application Laid-Open (JP-A) No. H11-255149. It is sometimes desirable to raise the rigidity of a part of such vehicle frame members. It would be conceivable to enlarge the cross-section or to increase the plate thickness of the part where increased rigidity is desired in such cases.

SUMMARY

However, it would be difficult to change a part of the cross-section profile if the member is extrusion-molded.

Alternatively, a reinforcing member or the like might conceivably be joined to the vehicle frame member in such cases. Fastening by bolts or rivets (see JP-A No. 2004-130985), welding (see, for example, JP-A No. 2013-184492), and clinching by electromagnetic tube compression (see, for example, JP-A No. 2014-184950), and so on are described as technology relating to joining members. However, additional processes are necessary when joining a reinforcing member or the like to a vehicle frame member using such technology, and so there is room for improvement regarding this point.

In consideration of the above circumstances, an object of preferred embodiments is to provide a vehicle frame body manufacturing method and a vehicle frame structure that are capable of joining a reinforcing member to a frame member in order to raise the rigidity of a part of the frame member without providing a separate joining process.

A method of manufacturing a vehicle frame body of a first aspect of the disclosure includes: a placement process of placing a reinforcing member at a portion of a frame member, the portion being located in a length direction of the frame member and within the frame member. The frame member is a single member and has an elongated shape and a chamber structure. The method further includes, after the placement process, a bending process of bending the frame member at a placement region of the reinforcing member, causing reaction force to be generated by the reinforcing member against the frame member which undergoes cross-sectional deformation, and pressure joining the reinforcing member to the frame member.

In the above configuration, in the placement process, the reinforcing member is placed at the portion in the length direction of the frame member and within the vehicle frame member, the frame member is a single member, has the elongated shape, and configures the chamber structure. In the bending process, the frame member is bent at the placement region of the reinforcing member, causing reaction force to be generated by the reinforcing member against the frame member that undergoes cross-sectional deformation, and pressure joining the reinforcing member to the frame member. There is accordingly no need to provide a separate process to join the reinforcing member to the frame member.

A method of manufacturing a vehicle frame body of a second aspect of the disclosure is the configuration of the first aspect, wherein the frame member includes a first wall that extends along the length direction of the frame member and that becomes a bent face outer circumference of the frame member as a result of the bending process, and a second wall that extends along the length direction of the frame member and that becomes a bent face inner circumference of the frame member as a result of the bending process. The placement process includes placing a part of the reinforcing member along an inside face of the first wall of the frame member, and placing another part of the reinforcing member along an inside face of the second wall of the frame member. The bending process includes pressure joining the part of the reinforcing member to the inside face of the first wall of the frame member, and pressure joining the other part of the reinforcing member to the inside face of the second wall of the frame member.

In the above configuration, the first wall of the frame member extends along the length direction of the frame member and becomes a wall portion at the bent face outer circumference as a result of the bending process, and the second wall of the frame member extends along the length direction of the frame member and becomes a wall portion at the bent face inner circumference as a result of the bending process. In the placement process, a part of the reinforcing member is placed along the inside face of the first wall of the frame member, and another part of the reinforcing member is placed along the inside face of the second wall of the frame member. In the bending process, the part of the reinforcing member is pressure joined to the inside face of the first wall of the frame member and the other part of the reinforcing member is pressure joined to the inside face of the second wall of the frame member. This enables the reinforcing member to be joined to the frame member without providing a separate process to join the reinforcing member to the frame member, even if the reinforcing member and the inside of the frame member do not have complex structures.

A method of manufacturing a vehicle frame body of a third aspect of the disclosure is the configuration of the first aspect, wherein the frame member includes a first wall that extends along the length direction of the frame member and that becomes a bent face outer circumference as a result of the bending process, a second wall that extends along the length direction of the frame member and that becomes a bent face inner circumference as a result of the bending process, a first side wall and a second side wall that respectively link both ends of the first wall and the second wall in a direction orthogonal to respective length directions of the first wall and the second wall. Moreover, the frame member includes a first anchored portion and a second anchored portion. The first anchored portion is formed at the first side wall and has a face facing an opposite direction from the second side wall so as to configure an anchored face. The second anchored portion is formed at the second side wall and has a face facing an opposite direction from the first side wall so as to configure an anchored face. The reinforcing member includes a first anchor portion, a second anchor portion, and a linking portion, and the first anchor portion and the second anchor portion are linked together by the linking portion. In the placement process, the first anchor portion of the reinforcing member is placed in a position adjacent to the anchored face of the first anchored portion of the frame member, and the second anchor portion of the reinforcing member is placed in a position adjacent to the anchored face of the second anchored portion of the frame member. In the bending process, at the first side wall and the second side wall, the first anchor portion is pressure joined to the anchored face of the first anchored portion and the second anchor portion is pressure joined to the anchored face of the second anchored portion.

In the above configuration, the first wall of the frame member extends along the length direction of the frame member and becomes a wall portion at the bent face outer circumference as a result of the bending process, and the second wall of the frame member extends along the length direction of the frame member and becomes a wall portion at the bent face inner circumference as a result of the bending process. The first side wall and the second side wall of the frame member respectively link both ends of the first wall and the second wall in a direction orthogonal to their respective length directions. The first anchored portion formed at the first side wall has the face facing the opposite direction from the second side wall so as to configure the anchored face, and the second anchored portion formed at the second side wall has the face facing the opposite direction from the first side wall so as to configure the anchored face. In the reinforcing member, the first anchor portion and the second anchor portion are linked together by the linking portion.

In the placement process, the first anchor portion of the reinforcing member is placed in a position adjacent to the anchored face of the first anchored portion of the frame member, and the second anchor portion of the reinforcing member is placed in a position adjacent to the anchored face of the second anchored portion of the frame member. In the bending process, at the first side wall and the second side wall, the first anchor portion is pressure joined to the anchored face of the first anchored portion and the second anchor portion is pressure joined to the anchored face of the second anchored portion. This enables the reinforcing member, which has been placed so as to span between the first side wall and the second side wall of the frame member, to be joined to the side walls.

A vehicle frame structure of a fourth aspect of the disclosure includes: a frame member including a single member, having an elongated shape and a chamber structure, the frame member is formed with a bend section, and has a bent axis; and a reinforcing member that is placed at a portion of the frame member, the portion is in a length direction of the frame member and within the frame member. The frame member includes a first wall that extends along the length direction of the frame member and that configures a bent face outer circumference of the bend section, and a second wall that extends along the length direction of the frame member and that configures a bent face inner circumference of the bend section. The reinforcing member includes a first reinforcing portion, a second reinforcing portion, and a linking portion. The first reinforcing portion is placed along an inside face of the first wall and includes a first pressure joined portion pressure joined to the inside face of the first wall at a location configuring the bend section. The second reinforcing portion is placed along an inside face of the second wall and includes a second pressure joined portion pressure joined to the inside face of the second wall at a location configuring the bend section. The linking portion links the first reinforcing portion and the second reinforcing portion together.

In the above configuration, the frame member includes a single member, has the elongated shape and configures the chamber structure, the frame member is formed with the bend section, and has a bent axis. The reinforcing member is placed at the portion of the frame member, the portion is in the length direction of the frame member and within the frame member. Thus, the location of the frame member where the reinforcing member has been placed is less liable to deform than locations of the frame member where the reinforcing member is not placed.

The first wall of the frame member extends along the length direction of the frame member and becomes a wall portion configuring the bent face outer circumference of the bend section, and the second wall of the frame member extends along the length direction of the frame member and becomes a wall portion configuring the bent face inner circumference of the bend section. At the reinforcing member, the first pressure joined portion of the first reinforcing portion is pressure joined to the inside face of the first wall at a location configuring the bend section, the second pressure joined portion of the second reinforcing portion is pressure joined to the inside face of the second wall at a location configuring the bend section, and the first reinforcing portion and the second reinforcing portion are linked together by the linking portion. The structure of the fourth aspect can be manufactured by the vehicle frame body manufacturing method of the second aspect, and the structure enables joining the reinforcing member to the frame member without providing a separate process to join the reinforcing member to the frame member.

A vehicle frame structure of a fifth aspect of the disclosure is, in the fourth aspect, a configuration wherein the frame member has the first wall and the second wall disposed at a top and a bottom of the frame member, the frame member further includes an outer wall that links a vehicle outer end of the first wall and a vehicle outer end of the second wall together in a vehicle vertical direction, an inner wall that links a vehicle inner end of the first wall and a vehicle inner end of the second wall together in the vehicle vertical direction, a first step portion that is formed at an inner wall side of the first wall and that faces a vehicle outer side, and a second step portion that is formed at an inner wall side of the second wall and that faces the vehicle outer side. A vehicle inner end of the first reinforcing portion is abutted by the first step portion, a vehicle inner end of the second reinforcing portion is abutted by the second step portion, and the linking portion links a vehicle outer end of the first reinforcing portion and a vehicle outer end of the second reinforcing portion together in the vehicle vertical direction and is placed along an inside face of the outer wall.

In the above configuration, the frame member has the first wall and the second wall disposed at the top and bottom, and the outer wall and the inner wall respectively link the first wall and the second wall together in the vehicle vertical direction. The first step portion is formed at the inner wall side of the first wall and faces the vehicle outer side, and the second step portion is formed at the inner wall side of the second wall and faces the vehicle outer side. The vehicle inner end of the first reinforcing portion is abutted by the first step portion, the vehicle inner end of the second reinforcing portion is abutted by the second step portion, and the linking portion links the vehicle outer end of the first reinforcing portion and the vehicle outer end of the second reinforcing portion together in the vehicle vertical direction and is placed along the inside face of the outer wall. Thus, when collision load is input to the bend section of the frame member from the vehicle outer side, some of the load is input to the linking portion of the reinforcing member from the outer wall of the frame member. Some of this load is then transmitted from the linking portion to the first step portion of the frame member through the first reinforcing portion, and some of this load is transmitted from the linking portion to the second step portion of the frame member through the second reinforcing portion. This enables the load to be efficiently transmitted.

A vehicle frame structure of a sixth aspect of the disclosure includes: a frame member including a single member, having an elongated shape and a chamber structure, the frame member is formed with a bend section, and has a bent axis; and a reinforcing member that is placed at a portion of the frame member, the portion is in a length direction of the frame member and within the frame member. The frame member includes a first wall that extends along a length direction of the frame member and that configures a bent face outer circumference of the bend section, a second wall that extends along the length direction of the frame member and that configures a bent face inner circumference of the bend section, and a first side wall and a second side wall that respectively link both ends of the first wall and the second wall in a direction orthogonal to respective length directions of the first wall and the second wall. Moreover, the frame member includes a first anchored portion that is formed at the first side wall and that has a face facing an opposite direction from the second side wall so as to configure an anchored face, and a second anchored portion that is formed at the second side wall and that has a face facing an opposite direction from the first side wall so as to configure an anchored face. The reinforcing member includes a first anchor portion, a second anchor portion, and a linking portion. The first anchor portion and the second anchor portion are linked together by the linking portion, the first anchor portion is anchored and pressure joined to the anchored face of the first anchored portion of the frame member at the bend section of the frame member, and the second anchor portion is anchored and pressure joined to the anchored face of the second anchored portion of the frame member at the bend section of the frame member.

In the above configuration, the frame member includes a single structure, and has the elongated shape and configures the chamber structure, the frame member is formed with the bend section, and has the bent axis. The reinforcing member is placed at the portion of the frame member in the length direction of the frame member and within the frame member. Thus, a location of the frame member where the reinforcing member has been placed is less liable to deform than locations of the frame member where the reinforcing member is not placed.

The first wall of the frame member extends along the length direction of the frame member and configures the bent face outer circumference of the bend section, and the second wall of the frame member extends along the length direction of the frame member and configures the bent face inner circumference of the bend section. The first side wall and the second side wall of the frame member respectively link both ends of the first wall and the second wall in a direction orthogonal to their respective length directions. The first anchored portion formed at the first side wall has the face facing the opposite direction from the second side wall so as to configure the anchored face, and the second anchored portion formed at the second side wall has the face facing the opposite direction from the first side wall so as to configure the anchored face. At the reinforcing member, the first anchor portion and the second anchor portion are linked together by the linking portion. The first anchor portion of the reinforcing member is anchored and pressure joined to the anchored face of the first anchored portion of the first side wall at the bend section of the frame member, and the second anchor portion of the reinforcing member is anchored and pressure joined to the anchored face of the second anchored portion of the second side wall at the bend section of the frame member. This structure can be manufactured by the vehicle frame body manufacturing method described in the third aspect, and enables joining the reinforcing member to the frame member without providing a separate process to join the reinforcing member to the frame member.

A vehicle frame structure of a seventh aspect of the disclosure is: in the sixth aspect, a configuration wherein the first side wall configures an outer wall in a vehicle width direction and the second side wall configures an inner wall in the vehicle width direction, and the linking portion links the first anchor portion and the second anchor portion together along a vehicle horizontal direction.

In the above configuration, when collision load is input to the bend section of the frame member from the vehicle outer side, some of the collision load is transmitted from the first side wall on the vehicle outer side of the frame member to the second side wall on the vehicle inner side of the frame member through the reinforcing member. This enables the load to be efficiently transmitted.

A vehicle frame structure of an eighth aspect of the disclosure is: in the fourth, fifth, or seventh aspect, a configuration wherein the frame member is a side frame member including a location extending from an upper edge of a front side door opening to an upper edge of a rear side door opening of a vehicle side section; a rear edge of the front side door opening and a front edge of the rear side door opening are formed by a center pillar, and an upper end of the center pillar is configured to be connected to a length direction intermediate portion of the side frame member; and the reinforcing member is configured to be placed in a region within the side frame member including a portion corresponding to the upper end of the center pillar.

In the above configuration, when collision load is input to the center pillar during a side-on collision, some of the collision load is transmitted from the upper end of the center pillar to the side frame member. Note that the reinforcing member is placed in a region within the side frame member including a portion corresponding to the upper end of the center pillar, such that deformation of the side frame member during a side-on collision is effectively suppressed.

As explained above, the present invention enables the reinforcing member to be joined to the frame member in order to raise the rigidity of a part of the frame member without providing a separate joining process.

BRIEF DESCRIPTION OF THE DRAWINGS

Preferred embodiments will be described in detail based on the following figures, wherein:

FIG. 7 is a vertical cross-section illustrating a vehicle frame structure according to a third exemplary embodiment of the present disclosure.

DETAILED DESCRIPTION

First Exemplary Embodiment

Figure 1A:
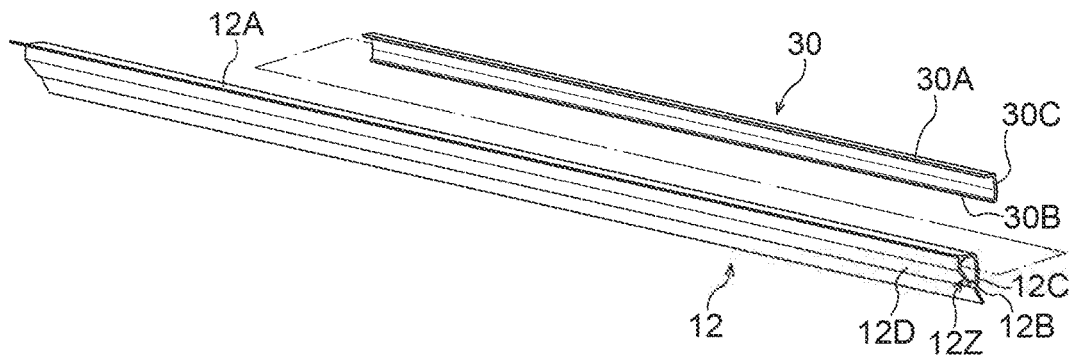
FIG. 1A is a process diagram illustrating a vehicle frame body manufacturing method according to a first exemplary embodiment of the present disclosure, and is a perspective view illustrating a state prior to a placement process.

Explanation follows regarding a vehicle frame body manufacturing method and a vehicle frame structure according to a first exemplary embodiment of the present disclosure, with reference to FIG. 1 to FIG. 5B. Note that in the drawings, the arrow FR indicates a vehicle front side, the arrow UP indicates a vehicle upper side, and the arrow OUT indicates a vehicle width direction inner side, as appropriate.

Figure 2:
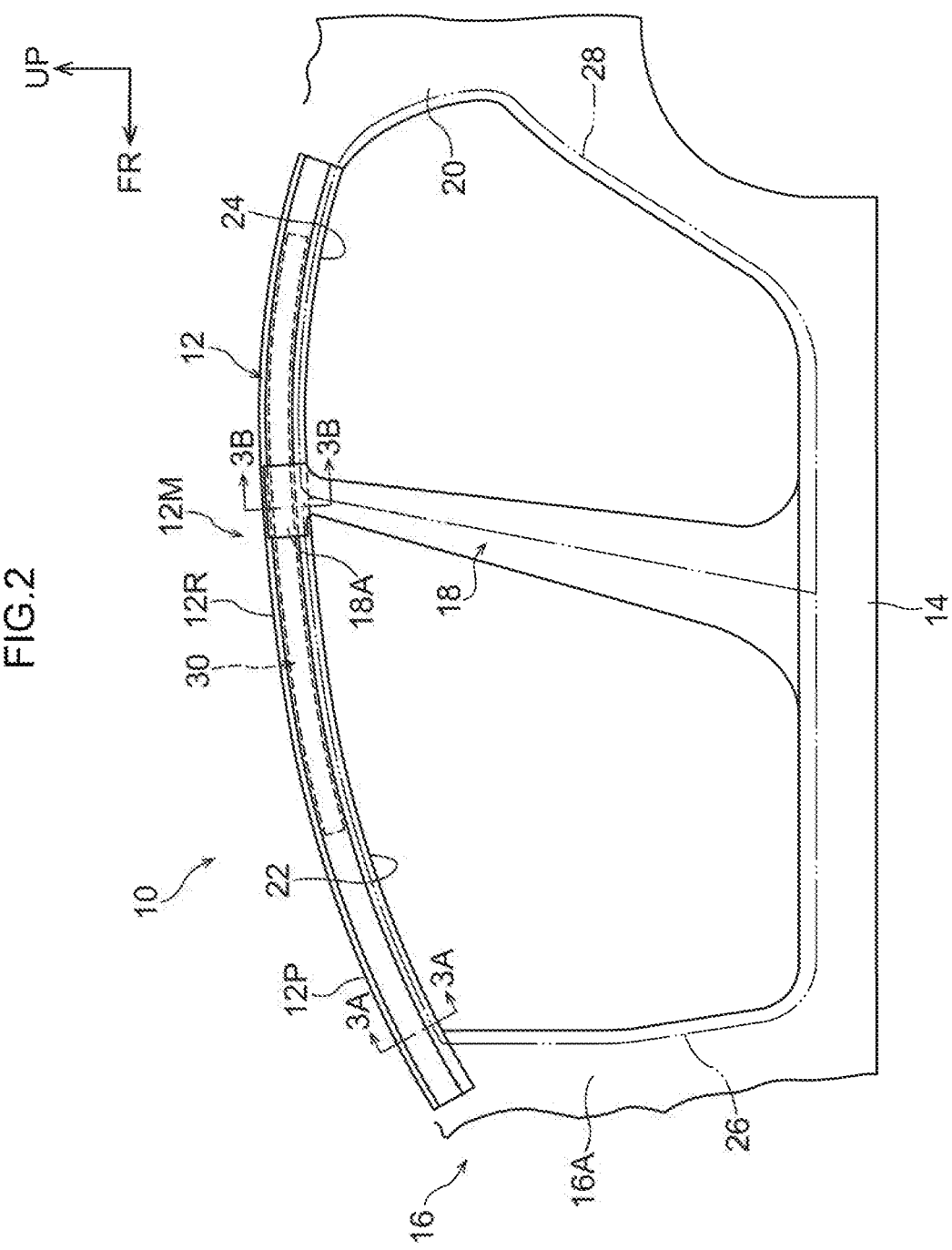
FIG. 2 is a side-on view schematically illustrating a part of a vehicle applied with a vehicle frame structure according to the first exemplary embodiment of the present disclosure.

FIG. 2 is a side-on view schematically illustrating a part of a vehicle applied with the vehicle frame structure according to the present exemplary embodiment. As illustrated in FIG. 2, a side frame member 12, serving as a vehicle frame member, is disposed at an upper portion of a vehicle side section 10. The side frame member 12 is an elongated-shaped member formed using an extruded member made of aluminum alloy (broadly speaking, made of lightweight metal), and is a member configured, as an example, by integrating a roof side section 12R and a front pillar upper section 12P. Although the side frame member 12 extends substantially along the vehicle front-rear direction, a curve-shaped bend section 12M is formed across substantially the entire length of the side frame member 12 such that its axis is bent, and a front portion of the side frame member 12 slopes toward the vehicle lower side on progression toward the vehicle front side.

A rocker 14 is disposed at a lower portion of the vehicle side section 10. The rocker 14 extends along the vehicle front-rear direction. A front pillar lower section 16A configuring a lower portion of a front pillar 16 projects out toward the vehicle upper side from a front end of the rocker 14. An upper end of the front pillar lower section 16A is connected to a front end of the side frame member 12. A center pillar 18 projects out toward the vehicle upper side from a length direction intermediate portion of the rocker 14, and an upper end 18A of the center pillar 18 is connected to a length direction intermediate portion of the side frame member 12. A quarter pillar 20 projects out toward the vehicle upper side at the vehicle rear side of the center pillar 18. An upper end of the quarter pillar 20 is connected to a rear end of the side frame member 12.

The side frame member 12, the rocker 14, the front pillar lower section 16A, the center pillar 18, and the quarter pillar 20 each have a closed cross-section (chamber) structure. A front side door opening 22, enclosed by the side frame member 12, the front pillar lower section 16A, the rocker 14, and the center pillar 18, is formed in a front portion of the vehicle side section 10. A rear side door opening 24, enclosed by vehicle body frame members including the side frame member 12, the center pillar 18, the rocker 14, and the quarter pillar 20, is formed in a rear portion of the vehicle side section 10. The center pillar 18 configures a rear edge of the front side door opening 22, configures a front edge of the rear side door opening 24, and is disposed along the vehicle vertical direction.

The front side door opening 22 and the rear side door opening 24 place a vehicle cabin exterior and a vehicle cabin interior in communication with each other. The front side door opening 22 is opened and closed by a front side door 26 (only the outer profile is illustrated by a double-dotted dashed line in FIG. 2), and the rear side door opening 24 is opened and closed by a rear side door 28 (only the outer profile is illustrated by a double-dotted dashed line in FIG. 2).

The above-described side frame member 12 is configured including a portion extending from an upper edge of the front side door opening 22 to an upper edge of the rear side door opening 24. A reinforcing member 30 is placed within the side frame member 12, in a region including a portion corresponding to the upper end 18A of the center pillar 18.

Figure 3A:
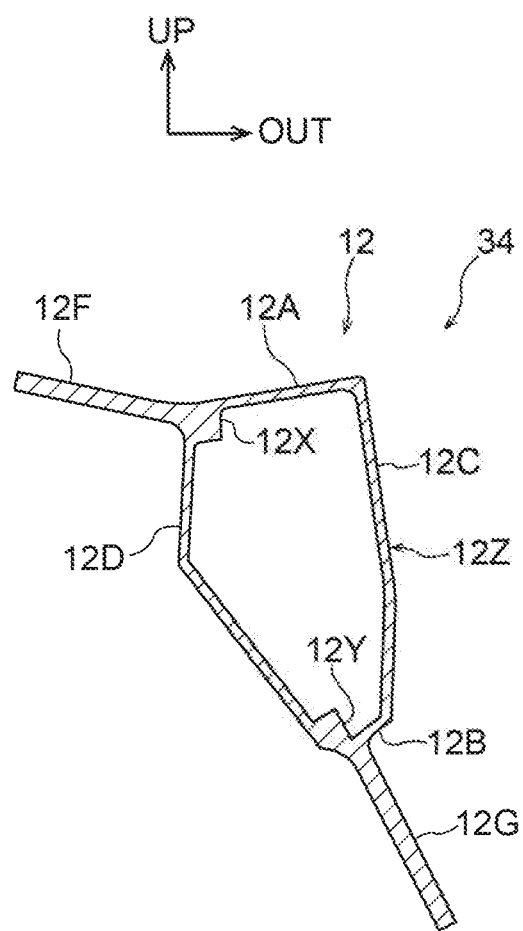
FIG. 3A is an enlarged vertical cross-section illustrating a state sectioned along line 3A-3A in FIG. 2.
Figure 3B:
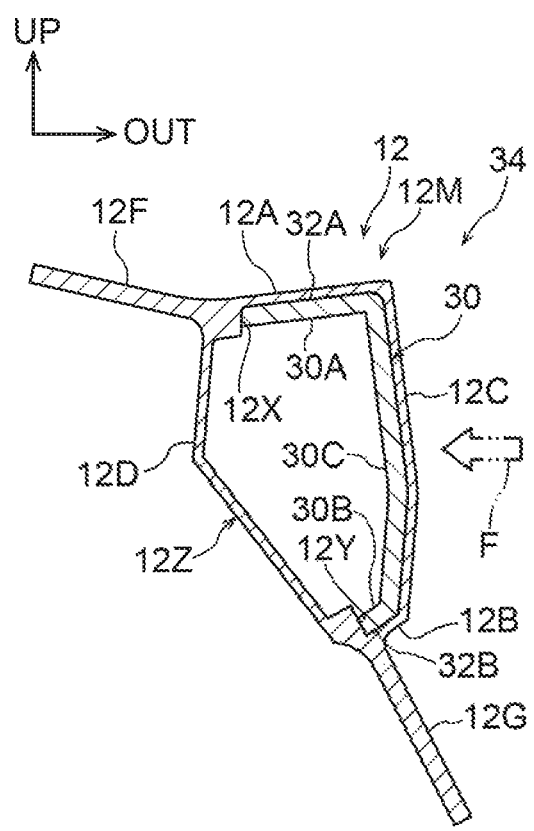
FIG. 3B is an enlarged vertical cross-section illustrating a state sectioned along line 3B-3B in FIG. 2.

FIG. 3A is an enlarged vertical cross-section illustrating a state sectioned along line 3A-3A in FIG. 2, and FIG. 3B is an enlarged vertical cross-section illustrating a state sectioned along line 3B-3B in FIG. 2. Note that the upper end 18A of the center pillar 18 illustrated in FIG. 2 is omitted from illustration in FIG. 3B. As illustrated in FIG. 3A and FIG. 3B, the side frame member 12 is a hollow member configuring a chamber structure 12Z using a single member, and includes an upper flange 12F jutting out toward the vehicle width direction inner side at an upper portion thereof, and a lower flange 12G jutting out toward the vehicle lower side at a lower portion thereof. The upper flange 12F and the lower flange 12G extend along the length direction of the side frame member 12.

The chamber structure 12Z of the side frame member 12 is formed by an upper wall 12A serving as a first wall, a lower wall 12B serving as a second wall, an outer wall 12C, and an inner wall 12D. The upper wall 12A, the lower wall 12B, the outer wall 12C, and the inner wall 12D all extend along the length direction of the side frame member 12 (see FIG. 1C).

The upper wall 12A configures an upper wall of the side frame member 12, and the lower wall 12B configures a lower wall of the side frame member 12. A vehicle width direction inner end of the upper wall 12A and a vehicle width direction outer end of the upper flange 12F are formed so as to be continuous to each other. A location at a lower face of the lower wall 12B and an upper end of the lower flange 12G are also formed so as to be continuous to each other. A vehicle width direction length of the upper wall 12A is set longer than a vehicle width direction length of the lower wall 12B, and a vehicle width direction inner end of the upper wall 12A is positioned further toward a vehicle width direction inner side than a vehicle width direction inner end of the lower wall 12B. As illustrated in FIG. 1C, the upper wall 12A configures a bent face outer circumference of the bend section 12M, and the lower wall 12B configures a bent face inner circumference of the bend section 12M.

The outer wall 12C and the inner wall 12D are a pair of side walls that respectively link both ends of the upper wall 12A and the lower wall 12B in a direction orthogonal to their respective length directions. As illustrated in FIG. 3A, the outer wall 12C links a vehicle width direction outer end of the upper wall 12A and a vehicle width direction outer end of the lower wall 12B in the vehicle vertical direction, and configures a vehicle width direction outer wall of the side frame member 12. The outer wall 12C is bent such that a vehicle vertical direction intermediate portion is positioned slightly further toward the vehicle width direction outer side than upper and lower ends thereof. The inner wall 12D links the vehicle width direction inner end of the upper wall 12A and the vehicle width direction inner end of the lower wall 12B in the vehicle vertical direction, and configures a vehicle width direction inner wall of the side frame member 12. The inner wall 12D is bent such that a vehicle vertical direction intermediate portion is positioned toward the vehicle width direction inner side than upper and lower ends thereof.

A first step portion 12X facing the vehicle width direction outer side is formed at an inner wall 12D side of the upper wall 12A. A second step portion 12Y facing toward the vehicle width direction outer side is formed at an inner wall 12D side of the lower wall 12B.

As illustrated in FIG. 1C, the reinforcing member 30 is placed at a portion located in the length direction within the side frame member 12. The reinforcing member 30 extends along the length direction of the side frame member 12. As illustrated in FIG. 3B, the reinforcing member 30 includes an upper reinforcing wall 30A serving as a first reinforcing portion placed along an inside face of the upper wall 12A, and also includes a lower reinforcing wall 30B serving as a second reinforcing portion placed along an inside face of the lower wall 12B. A vehicle width direction outer end of the upper reinforcing wall 30A and a vehicle width direction outer end of the lower reinforcing wall 30B are linked together in the vehicle vertical direction by a linking portion 30C. The linking portion 30C is placed along an inside face of the outer wall 12C.

The upper reinforcing wall 30A includes an upper pressure joined portion 32A serving as a first pressure joined portion that is pressure joined to the inside face of the upper wall 12A at a location configuring the bend section 12M (see FIG. 2). The lower reinforcing wall 30B includes a lower pressure joined portion 32B serving as a second pressure joined portion that is pressure joined to the inside face of the lower wall 12B at a location configuring the bend section 12M. A vehicle width direction inner end of the upper reinforcing wall 30A abuts and contacts the first step portion 12X, and a vehicle width direction inner end of the lower reinforcing wall 30B abuts and contacts the second step portion 12Y.

Vehicle Frame Body Manufacturing Method

Figure 1B:
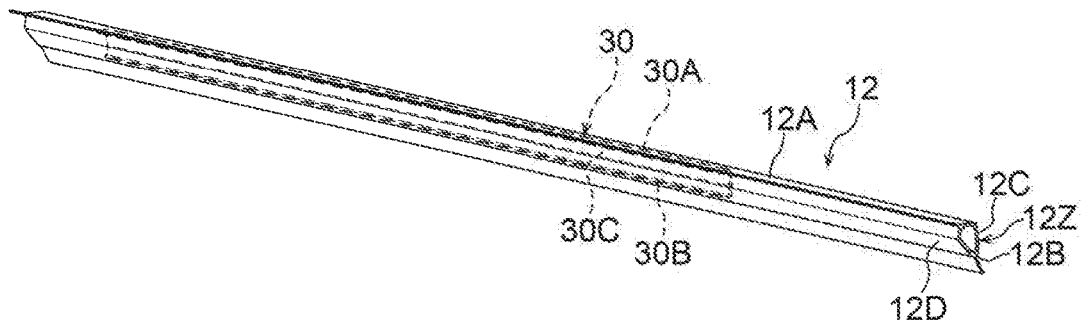
FIG. 1B is a process diagram illustrating a vehicle frame body manufacturing method according to the first exemplary embodiment of the present disclosure, and is a perspective view illustrating a state after a placement process and prior to a bending process.
Figure 1C:
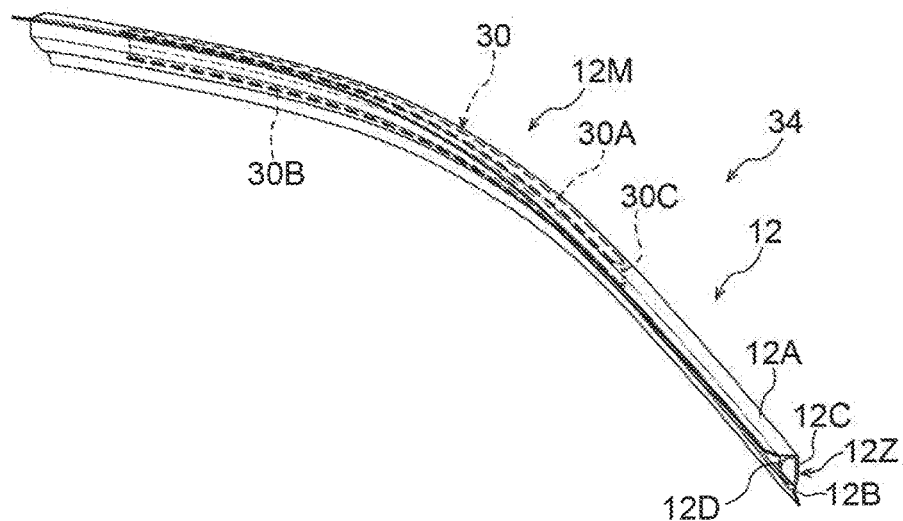
FIG. 1C is a process diagram illustrating a vehicle frame body manufacturing method according to the first exemplary embodiment of the present disclosure, and is a perspective view illustrating a state after a bending process.

A vehicle frame body 34 including the side frame member 12 and the reinforcing member 30 explained above is manufactured by the processes illustrated in FIG. 1A to FIG. 1C. FIG. 1A is a perspective view illustrating a state prior to a placement process, FIG. 1B is a perspective view illustrating a state after the placement process but prior to a bending process, and FIG. 1C is a perspective view illustrating a state after the bending process. Note that the respective shapes of the side frame member 12 and the reinforcing member 30 have changed in the state after the bending illustrated in FIG. 1C compared to the states prior to the bending illustrated in FIG. 1A and FIG. 1B; however, these members are appended with the same reference numerals for convenience.

As illustrated in FIG. 1A and FIG. 1B, in the placement process, the reinforcing member 30 is inserted into the vehicle side frame member 12, which has an elongated shape and configures the chamber structure 12Z using a single member, prior to bending the side frame member 12. The reinforcing member 30 is placed at a portion located in the length direction within the side frame member 12. To explain more specifically, in the placement process, the upper reinforcing wall 30A of the reinforcing member 30 (a part of the reinforcing member 30) is placed along the inside face of the upper wall 12A of the side frame member 12, and the lower reinforcing wall 30B of the reinforcing member 30 (another part of the reinforcing member 30) is placed along the inside face of the lower wall 12B of the side frame member 12. At a timing of the placement process, the side frame member 12 and the reinforcing member 30 are straight-shaped members, and the upper wall 12A, the lower wall 12B, the outer wall 12C, and the inner wall 12D of the side frame member 12 all extend in straight shapes along the length direction of the side frame member 12.

Next, as illustrated in FIG. 1C, in the bending process, the side frame member 12 is bent in a region corresponding to the placement region of the reinforcing member 30, causing reaction force to be generated by the reinforcing member 30 against the side frame member 12 undergoing cross-sectional deformation, and pressure joining the reinforcing member 30 to the side frame member 12. In the bending process, at the bend location of the side frame member 12, the upper reinforcing wall 30A of the reinforcing member 30 is pressure joined to the inside face of the upper wall 12A of the side frame member 12, and the lower reinforcing wall 30B of the reinforcing member 30 is pressure joined to the inside face of the lower wall 12B of the side frame member 12.

Namely, in the manufacturing method of the vehicle frame body 34 according to the present exemplary embodiment, during bending, force attempting to deform the upper wall 12A and the lower wall 12B of the side frame member 12 in directions in which the spacing therebetween narrows is utilized to pressure join the reinforcing member 30 to the side frame member 12.

Note that the upper wall 12A of the side frame member 12 becomes the bent face outer circumference in the bending process, and the lower wall 12B of the side frame member 12 becomes the bent face inner circumference in the bending process. As an example, a known bending machine is employed to bend the side frame member 12 and the reinforcing member 30.

The vehicle frame body 34 is manufactured in the above manner. In the manufacturing method of the vehicle frame body 34 explained above, there is no need to provide a separate process to join the reinforcing member 30 to the side frame member 12. Moreover, since the reinforcing member 30 is pressure joined to the side frame member 12, there is no need for the inside of the side frame member 12 and for the reinforcing member 30 to have complex structures.

Figure 4A:
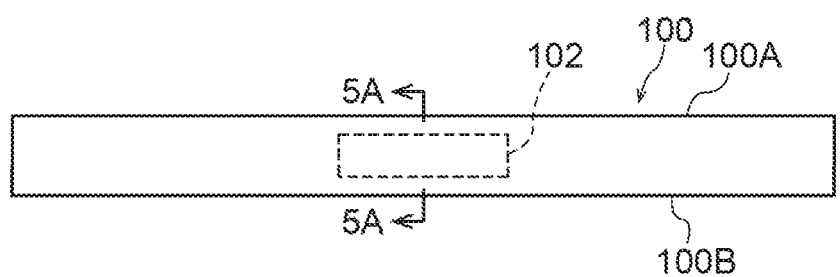
FIG. 4A is a schematic diagram for explaining a pressure joining mechanism during bending, and is a side-on view schematically illustrating a state after a placement process and prior to a bending process.
Figure 4B:
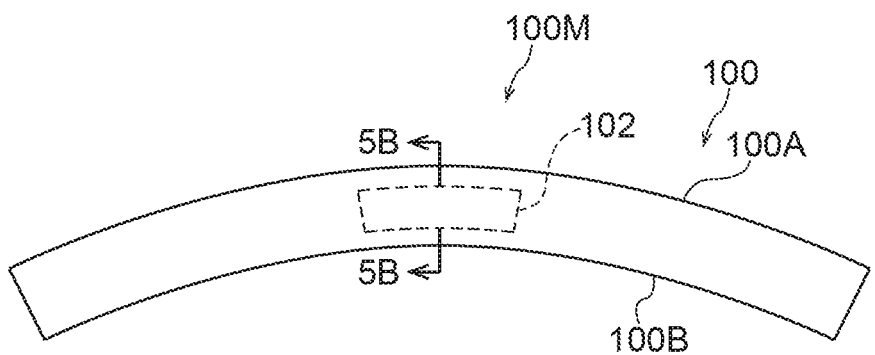
FIG. 4B is a side-on view schematically illustrating a state after a bending process.
Figure 5A:
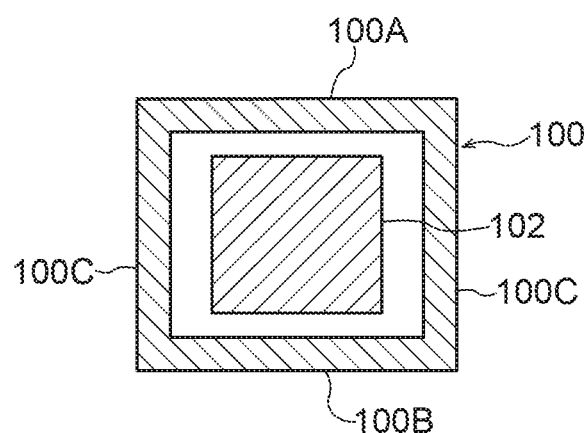
FIG. 5A is a schematic diagram for explaining a pressure joining mechanism during bending, and is an enlarged vertical cross-section schematically illustrating a state sectioned along line 5A-5A in FIG. 4A.
Figure 5B:
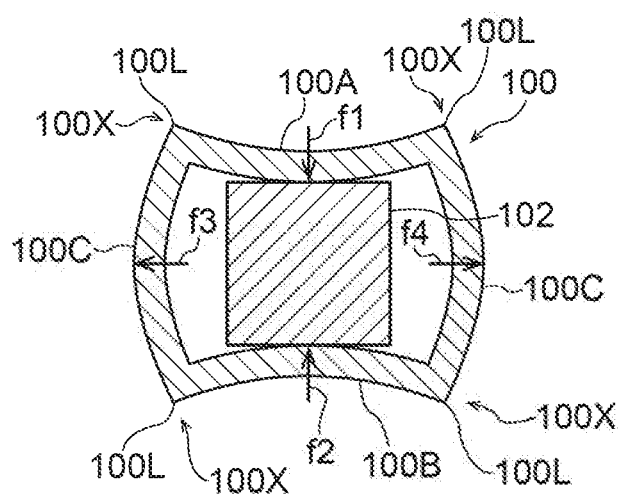
FIG. 5B is an enlarged vertical cross-section schematically illustrating a state sectioned along line 5B-5B in FIG. 4B.

Explanation follows regarding the mechanism by which the reinforcing member 30 is pressure joined to the side frame member 12 by the above-described bending, with reference to the schematic diagrams illustrated in FIG. 4A to FIG. 5B. FIG. 4A is a side-on view schematically illustrating a state after the placement process and prior to the bending process, and FIG. 4B is a side-on view schematically illustrating a state after the bending process. FIG. 5A is an enlarged vertical cross-section schematically illustrating a state sectioned along line 5A-5A in FIG. 4A, and FIG. 5B is an enlarged vertical cross-section schematically illustrating a state sectioned along line 5B-5B in FIG. 4B.

In FIG. 4A to FIG. 5B, the reference numeral 100 indicates a schematically-illustrated angular tube-shaped frame member, and the reference numeral 102 indicates a schematically-illustrated reinforcing member. As illustrated in FIG. 5A, the frame member 100 includes an upper wall 100A serving as a first wall, a lower wall 100B serving as a second wall, and a pair of side walls 100C that respectively link both ends of the upper wall 100A and the lower wall 100B in a direction orthogonal to their respective length directions.

When the frame member 100 is bent at a region corresponding to the placement region of the reinforcing member 102 as illustrated in FIG. 4B, respective illustrated intermediate portions in the left and right direction of the upper wall 100A and the lower wall 100B, which configure a bent face outer circumference and a bent face inner circumference of the frame member 100, deform in directions approaching each other (see the arrows f1, f2), and respective illustrated intermediate portions in the vertical direction of the pair of side walls 100C deform in directions moving away from each other (see the arrows f3, f4) at a bend section 100M of the frame member 100 as illustrated in FIG. 5B.

To supplement this explanation, the respective lengths of the upper wall 100A at the bent face outer circumference and the lower wall 100B at the bent face inner circumference basically do not change when the frame member 100 is bent, and so the upper wall 100A and the lower wall 100B deform in directions in which their cross-sections are squashed. Moreover, ridge portions 100L of the frame member 100 have a higher rigidity than surrounding portions thereof, and so the angle before bending of corner portions 100X that respectively include the ridge portions 100L barely changes after bending. Thus, the pair of side walls 100C deform in directions so as to expand when the frame member 100 is bent. Note that in FIG. 5B, illustration of the deformed shape of the frame member 100 is slightly exaggerated in order to clearly illustrate the deformed state of the frame member 100.

As illustrated in FIG. 5B, when the upper wall 100A at the bent face outer circumference and the lower wall 100B at the bent face inner circumference are pressed against the reinforcing member 102, reaction force is generated from a reinforcing member 102 side against the upper wall 100A and the lower wall 100B, and the reinforcing member 102 is pressure joined to the upper wall 100A and the lower wall 100B.

As explained above, the present exemplary embodiment enables the reinforcing member 30 to be joined to the side frame member 12 in order to raise rigidity at the portion of the side frame member 12 illustrated in FIG. 1, etc., without providing a separate joining process. Productivity is therefore improved.

Note that, for example, in a comparative structure in which a reinforcing member is joined to a frame member by welding, issues might occur such as the surface accuracy of the join target decreasing or the base material changing due to heating during welding; however, the present exemplary embodiment enables such problems to be avoided. Moreover, in the above comparative structure, the weld bead thickness of weld portions needs to be finished or modified; however, this is not necessary in the present exemplary embodiment, and so productivity is good from this perspective also.

Operation and Advantageous Effects of Vehicle Frame Structure

Explanation follows regarding operation and advantageous effects of the vehicle frame structure according to the present exemplary embodiment illustrated in FIG. 2, etc. First, the location of the side frame member 12 where the reinforcing member 30 has been placed is less liable to deform than locations of the side frame member 12 where the reinforcing member 30 is not placed.

Moreover, when collision load is input to the center pillar 18 during a side-on collision, some of the collision load is transmitted from the upper end 18A of the center pillar 18 to the side frame member 12. Since the reinforcing member 30 is placed within the side frame member 12 in a region including a portion corresponding to the upper end 18A of the center pillar 18, deformation of the side frame member 12 during a side-on collision is effectively suppressed.

Moreover, as illustrated in FIG. 3B, the first step portion 12X that faces the vehicle width direction outer side is formed at the inner wall 12D side of the upper wall 12A, and the second step portion 12Y that faces the vehicle width direction outer side is formed at the inner wall 12D side of the lower wall 12B. In the reinforcing member 30, the vehicle width direction inner end of the upper reinforcing wall 30A is abutted by the first step portion 12X, and the vehicle width direction inner end of the lower reinforcing wall 30B is abutted by the second step portion 12Y. Moreover, the linking portion 30C is placed along the inside face of the outer wall 12C so as to link the vehicle width direction outer end of the upper reinforcing wall 30A and the vehicle width direction outer end of the lower reinforcing wall 30B together in the vehicle vertical direction. Thus, in cases in which a collision load F is input to the bend section 12M of the side frame member 12 from the vehicle width direction outer side, some of the load is input to the linking portion 30C of the reinforcing member 30 from the outer wall 12C of the side frame member 12. Some of this load is then transmitted from the linking portion 30C to the first step portion 12X of the side frame member 12 through the upper reinforcing wall 30A, and some is transmitted from the linking portion 30C to the second step portion 12Y of the side frame member 12 through the lower reinforcing wall 30B. This enables the load to be efficiently transmitted.

Second Exemplary Embodiment

Figure 6:
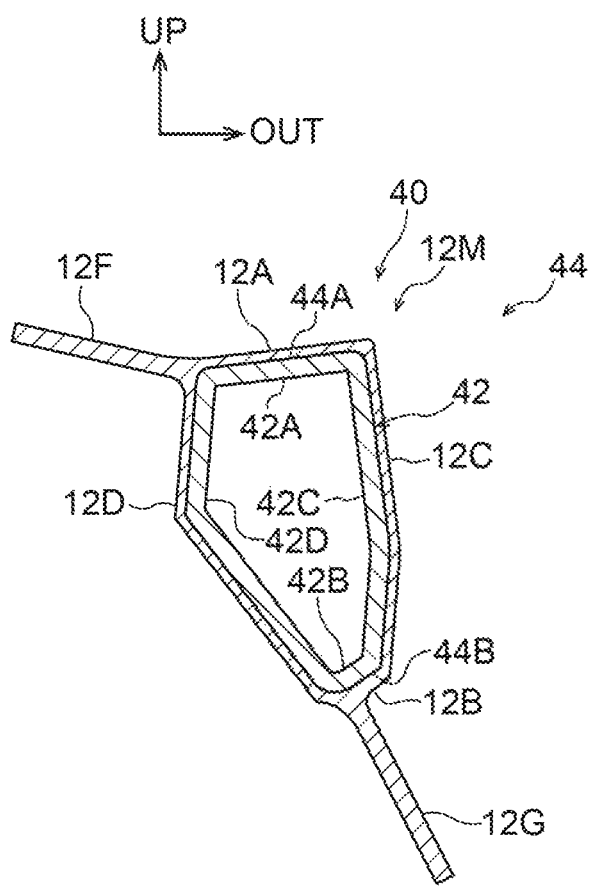
FIG. 6 is a vertical cross-section illustrating a vehicle frame structure according to a second exemplary embodiment of the present disclosure.

Explanation follows regarding a second exemplary embodiment with reference to FIG. 6, while incorporating the drawings illustrating the first exemplary embodiment. FIG. 6 is a vertical cross-section (a cross-section corresponding to the first exemplary embodiment in FIG. 3B) illustrating a vehicle frame structure according to the present exemplary embodiment. As illustrated in FIG. 6, the present exemplary embodiment differs from the first exemplary embodiment in that the first step portion 12X and the second step portion 12Y illustrated in FIG. 3 are not formed at a side frame member 40 serving as a frame member, and in that a reinforcing member 42 is placed instead of the reinforcing member 30. Other configuration is similar to the configuration of the first exemplary embodiment. Thus, configuration portions that are basically the same as those in the first exemplary embodiment are appended with the same reference numerals and explanation thereof is omitted.

The side frame member 40 is similarly configured to the side frame member 12 of the first exemplary embodiment (see FIG. 3), with the exception of the above-mentioned points.

As illustrated in FIG. 6, the reinforcing member 42 is a hollow member formed in a tube shape. As an example, a length of the reinforcing member 42 is set so as to be similar to the length of the reinforcing member 30 (see FIG. 2, etc.) of the first exemplary embodiment. The reinforcing member 42 includes an upper reinforcing wall 42A serving as a first reinforcing portion placed along the inside face of the upper wall 12A of the side frame member 40, and also includes a lower reinforcing wall 42B serving as a second reinforcing portion placed along the inside face of the lower wall 12B of the side frame member 40. A vehicle width direction outer end of the upper reinforcing wall 42A and a vehicle width direction outer end of the lower reinforcing wall 42B are linked together in the vehicle vertical direction by an outer reinforcing wall 42C serving as a linking portion. A vehicle width direction inner end of the upper reinforcing wall 42A and a vehicle width direction inner end of the lower reinforcing wall 42B are linked together in the vehicle vertical direction by an inner reinforcing wall 42D, also serving as a linking portion. The outer reinforcing wall 42C is placed along the inside face of the outer wall 12C of the side frame member 40, and the inner reinforcing wall 42D is placed along an inside face of the inner wall 12D of the side frame member 40.

The upper reinforcing wall 42A includes an upper pressure joined portion 44A, serving as a first pressure joined portion that is pressure joined to the inside face of the upper wall 12A at a location configuring the bend section 12M (see FIG. 2). The lower reinforcing wall 42B includes a lower pressure joined portion 44B, serving as a second pressure joined portion that is pressure joined to the inside face of the lower wall 12B at a location configuring the bend section 12M (see FIG. 2).

A vehicle frame body 44 including the side frame member 40 and the reinforcing member 42 explained above is manufactured by similar processes to the manufacturing method of the vehicle frame body 34 of the first exemplary embodiment illustrated in FIG. 1A to FIG. 1C. Namely, the placement process (see FIG. 1A and FIG. 1B) and the bending process (see FIG. 1C) are implemented to a configuration in which the side frame member 40 (see FIG. 6) is applied instead of the side frame member 12 of the first exemplary embodiment, and the reinforcing member 42 (see FIG. 6) is applied instead of the reinforcing member 30 of the first exemplary embodiment. In the bending process (see FIG. 1C), the upper pressure joined portion 44A of the reinforcing member 42 illustrated in FIG. 6 is pressure joined to the inside face of the upper wall 12A of the side frame member 40, and the lower pressure joined portion 44B of the reinforcing member 42 is pressure joined to the inside face of the lower wall 12B of the side frame member 40.

Namely, in the manufacturing method of the vehicle frame body 44 according to the present exemplary embodiment, during bending, force attempting to deform the upper wall 12A at the bent face outer circumference and the lower wall 12B at the bent face inner circumference of the side frame member 40 in directions in which the spacing therebetween narrows is utilized to pressure join the reinforcing member 42 to the side frame member 40, similarly to in the first exemplary embodiment.

Thus, the present exemplary embodiment explained above also enables the reinforcing member 42 to be joined to the side frame member 40 in order to raise rigidity at a portion of the side frame member 40 without providing a separate joining process, similarly to in the first exemplary embodiment.

Third Exemplary Embodiment

Explanation follows regarding a third exemplary embodiment with reference to FIG. 7, while incorporating the drawings illustrating the first exemplary embodiment. FIG. 7 is a vertical cross-section (a cross-section corresponding to the first exemplary embodiment in FIG. 3B) illustrating a vehicle frame structure according to the present exemplary embodiment. The present exemplary embodiment differs from the first exemplary embodiment in that the first step portion 12X and the second step portion 12Y illustrated in FIG. 3 are not formed at a side frame member 50 serving as a frame member, and in that a guide section 52 including first anchored portions 52A and a guide section 54 including second anchored portions 54A are formed at the side frame member 50. The present exemplary embodiment also differs from the first exemplary embodiment in that a reinforcing member 60 is placed instead of the reinforcing member 30 (see FIG. 3). Other configuration is similar to the configuration of the first exemplary embodiment. Thus, configuration portions that are basically the same as those in the first exemplary embodiment are appended with the same reference numerals, and explanation thereof is omitted.

As illustrated in FIG. 7, the side frame member 50 has a similar configuration to that of the side frame member 12 (see FIG. 3) of the first exemplary embodiment with the exception of the above-mentioned points.

As illustrated in FIG. 7, the channel-shaped guide section 52, which is open toward the vehicle width direction inner side in a vehicle face-on view, is formed at an intermediate portion in the vehicle vertical direction of the outer wall 12C (a first side wall) of the side frame member 50. The guide section 52 includes the first anchored portions 52A that have faces facing the opposite direction to the inner wall 12D (the second side wall) so as to configure anchored faces 52X. Moreover, the channel-shaped guide section 54, which is open toward the vehicle width direction outer side in a vehicle face-on view, is formed at an intermediate portion in the vehicle vertical direction of the inner wall 12D (the second side wall) of the side frame member 50. The guide section 54 includes the second anchored portions 54A that have faces facing the opposite direction to the outer wall 12C (the first side wall) so as to configure anchored faces 54X. The guide section 52 and the guide section 54 are formed at the same positions as each other in the vehicle vertical direction.

The reinforcing member 60 is placed at a portion located in a length direction within the side frame member 50. As an example, a length in a longitudinal direction of the reinforcing member 60 is set so as to be similar to a length in a longitudinal direction of the reinforcing member 30 (see FIG. 2, etc.) of the first exemplary embodiment. A first anchor portion 62 and a second anchor portion 64 of the reinforcing member 60 are linked together by a linking portion 66. The linking portion 66 is disposed along the vehicle width direction in vehicle face-on view. Namely, the linking portion 66 links the first anchor portion 62 and the second anchor portion 64 together along the vehicle width direction (a vehicle horizontal direction).

The first anchor portion 62 is formed so as to be continuous to a vehicle width direction outer end of the linking portion 66 and jut out toward the vehicle upper side and vehicle lower side respectively. The first anchor portion 62 is anchored and pressure joined to the anchored faces 52X of the first anchored portions 52A of the outer wall 12C (the first side wall) at the bend section 12M (see FIG. 2) of the side frame member 50. The second anchor portion 64 is formed so as to be continuous to a vehicle width direction inner end of the linking portion 66 and jut out toward the vehicle upper side and vehicle lower side respectively. The second anchor portion 64 is anchored and pressure joined to the anchored faces 54X of the second anchored portions 54A of the inner wall 12D (the second side wall) at the bend section 12M (see FIG. 2) of the side frame member 50.

A vehicle frame body 70 including the side frame member 50 and the reinforcing member 60 explained above is manufactured by similar processes to the manufacturing method of the vehicle frame body 34 of the first exemplary embodiment illustrated in FIG. 1A to FIG. 1C. Namely, the placement process (see FIG. 1A and FIG. 1B) and the bending process (see FIG. 1C) are implemented to a configuration in which the side frame member 50 (see FIG. 7) is applied instead of the side frame member 12 and the reinforcing member 60 (see FIG. 7) is applied instead of the reinforcing member 30, of the first exemplary embodiment.

In the placement process, as illustrated in FIG. 7, the first anchor portion 62 is inserted into the guide section 52 of the side frame member 50, the second anchor portion 64 is inserted into the guide section 54, and the reinforcing member 60 is slid along the guide sections 52, 54. The first anchor portion 62 is placed at a position adjacent to the anchored faces 52X of the first anchored portions 52A, and the second anchor portion 64 is placed at a position adjacent to the anchored faces 54X of the second anchored portions 54A.

In the bending process, on the outer wall 12C side at the bend location of the side frame member 50, the first anchor portion 62 is pressure joined to the anchored faces 52X of the first anchored portions 52A of the side frame member 50. Moreover, on the inner wall 12D side at the bend location of the side frame member 50, the second anchor portion 64 is pressure joined to the anchored faces 54X of the second anchored portions 54A of the side frame member 50.

Namely, in the manufacturing method of the vehicle frame body 70 according to the present exemplary embodiment, during bending, force attempting to deform the outer wall 12C and the inner wall 12D in directions in which the spacing therebetween widens is utilized to pressure join the reinforcing member 60 to the side frame member 50.

Thus, the present exemplary embodiment explained above enables the reinforcing member 60 to be joined to the side frame member 50 in order to raise rigidity at the portion of the side frame member 50 without providing a separate joining process, similarly to in the first exemplary embodiment. Moreover, the reinforcing member 60, which is placed so as to span between the outer wall 12C and the inner wall 12D of the side frame member 50, enables the outer wall 12C and the inner wall 12D of the side frame member 50 to be joined together.

In the vehicle frame structure according to the present exemplary embodiment, when collision load is input to the bend section 12M (see FIG. 2) of the side frame member 50 from the vehicle width direction outer side during a side-on collision, some of the collision load is transmitted from the outer wall 12C to the inner wall 12D of the side frame member 50 through the reinforcing member 60. When this occurs, the linking portion 66 of the reinforcing member 60 bears load in an axial compression direction of the linking portion 66 in a vehicle face-on view, thereby enabling the load to be efficiently transmitted.

Supplementary Explanation of Exemplary Embodiments

Note that in the first to third exemplary embodiments described above, the side frame members 12, 40, 50 each configure a member applied as a frame member of the present disclosure; however, the member applied as a frame member of the present disclosure may be another frame member, such as bumper reinforcement, roof center reinforcement, or an upper edge frame member of a back door opening.

The above-described exemplary embodiments and the above-mentioned modified example may be combined and implemented as appropriate.

Examples of the present invention have been explained above; however, the present invention is not limited to the above, and obviously various other modifications may be implemented within a range not departing from the range of the claims of the present application.

What is claimed is:

1. A vehicle frame structure comprising:
   a frame member being a single member and having an elongated shape and a chamber structure, the frame member being formed with a bend section and having a bent axis; and
   a reinforcing member placed at a portion of the frame member, the portion being in a length direction of the frame member and within the frame member;
   the frame member including:
      a first wall that extends along the length direction of the frame member and that forms a bent face outer circumference of the bend section, and
      a second wall that extends along the length direction of the frame member and that forms a bent face inner circumference of the bend section; and the reinforcing member including:
      a first reinforcing portion that is placed along an inside face of the first wall and that includes a first pressure joined portion pressure joined to the inside face of the first wall at a location forming the bend section,
      a second reinforcing portion that is placed along an inside face of the second wall and that includes a second pressure joined portion pressure joined to the inside face of the second wall at a location forming the bend section, and
      a linking portion that links the first reinforcing portion and the second reinforcing portion together, wherein:
   the first wall and the second wall are disposed at a top and a bottom of the frame member;
   the frame member further includes:
      an outer wall that links a vehicle outer end of the first wall and a vehicle outer end of the second wall together in a vehicle vertical direction,
      an inner wall that links a vehicle inner end of the first wall and a vehicle inner end of the second wall together in the vehicle vertical direction,
      a first step portion that is formed at an inner wall side of the first wall and that faces a vehicle outer side, and
      a second step portion that is formed at an inner wall side of the second wall and that faces the vehicle outer side; and
   a vehicle inner end of the first reinforcing portion is abutted by the first step portion, a vehicle inner end of the second reinforcing portion is abutted by the second step portion, and the linking portion links a vehicle outer end of the first reinforcing portion and a vehicle outer end of the second reinforcing portion together in the vehicle vertical direction and is placed along an inside face of the outer wall of the frame member.

2. The vehicle frame structure of claim 1, wherein:
the frame member is a side frame member including a location extending from an upper edge of a front side door opening to an upper edge of a rear side door opening of a vehicle side section;
a rear edge of the front side door opening and a front edge of the rear side door opening are formed by a center pillar, and an upper end of the center pillar is configured to be connected to a length direction intermediate portion of the side frame member; and
the reinforcing member is configured to be placed in a region within the side frame member including a portion corresponding to the upper end of the center pillar.

3. The vehicle frame structure of claim 1, wherein:
the first step portion is formed at a corner between the inner wall and the first wall, and faces a vehicle outer side,
the second step portion is formed at a corner between the inner wall and the second wall, and faces the vehicle outer side;
the vehicle inner end of the first reinforcing portion abuts a surface of the first step portion, the surface facing toward the vehicle outer side,
the vehicle inner end of the second reinforcing portion abuts a surface of the second step portion, the surface facing toward the vehicle outer side, and
the linking portion links the vehicle outer end of the first reinforcing portion and the vehicle outer end of the second reinforcing portion.

* * * * *